United States Patent

Rosenfield

[11] Patent Number: 5,664,822
[45] Date of Patent: Sep. 9, 1997

[54] TAILGATE GAP COVER

[76] Inventor: Gerald F. Rosenfield, 30424 NE. 190th, Duvall, Wash. 98019

[21] Appl. No.: 472,190

[22] Filed: Jun. 7, 1995

[51] Int. Cl.[6] .................................................. B62D 33/02
[52] U.S. Cl. .............................. 296/39.2; 49/383; 16/250
[58] Field of Search ............................ 296/39.2, 97.23, 296/37.16, 39.1; 49/383, 482.1; 52/783.19, 783.14, 799.1; 16/250, 251

[56] References Cited

U.S. PATENT DOCUMENTS

| | | | |
|---|---|---|---|
| 2,258,447 | 4/1941 | Fairbanks | 296/57.1 |
| 3,544,155 | 12/1970 | Gardner | 296/57.1 |
| 3,814,473 | 6/1974 | Lorenzen | 296/39.2 |
| 3,881,768 | 5/1975 | Nix | 296/39.2 |
| 4,161,335 | 7/1979 | Nix | 296/50 X |
| 4,181,349 | 1/1980 | Nix | 296/50 X |
| 4,333,678 | 6/1982 | Munoz | 296/39.2 |
| 4,336,963 | 6/1982 | Nix | 296/39.2 |
| 4,341,412 | 7/1982 | Wayne | 296/39.2 |
| 4,575,146 | 3/1986 | Markos | 296/39.2 |
| 4,592,583 | 6/1986 | Dresen | 296/39.2 |
| 4,752,096 | 6/1988 | Ishikawa | 296/37.16 |
| 4,752,097 | 6/1988 | Van Kirk | 220/410 X |
| 4,763,945 | 8/1988 | Murray | 296/39.2 X |
| 4,848,826 | 7/1989 | Kuwabara et al. | 296/97.23 |
| 4,875,731 | 10/1989 | Ruiz | 296/37.2 |
| 4,944,612 | 7/1990 | Abstetar | 296/39.2 |
| 4,960,301 | 10/1990 | Fry et al. | 296/39.2 |
| 4,986,590 | 1/1991 | Patti et al. | 296/39.2 |
| 4,997,227 | 3/1991 | Falzone et al. | 296/39.2 |
| 5,046,774 | 9/1991 | Stockell et al. | 296/38 |
| 5,090,763 | 2/1992 | Kremer et al. | 296/39.1 |
| 5,092,077 | 3/1992 | Teinturier-Milgram | 49/383 |
| 5,188,415 | 2/1993 | Wagner | 296/57.1 |
| 5,220,708 | 6/1993 | Lucas et al. | 49/383 |
| 5,257,850 | 11/1993 | Brim | 296/39.2 |
| 5,419,084 | 5/1995 | Sankey et al. | 49/383 |

FOREIGN PATENT DOCUMENTS

| | | | |
|---|---|---|---|
| 4207385 | 9/1993 | Germany | 49/383 |
| 77539 | 4/1986 | Japan | 296/97.23 |
| 2218449 | 11/1989 | United Kingdom | 49/383 |
| 2247039 | 2/1992 | United Kingdom | 49/383 |

Primary Examiner—Dennis H. Pedder
Attorney, Agent, or Firm—William G. Forster

[57] ABSTRACT

A tailgate gap cover for attachment to pickup trucks to cover the gap formed between the tailgate and the truck bed. The tailgate gap cover includes a plurality of adjacently disposed interconnected panels, the arrangement of all the panels thereof comprising: a truck bed panel disposed for removable attachment to the truck bed of a pickup truck, adjacent the tailgate gap; a tailgate panel disposed for removable attachment to the tailgate of a pickup truck, adjacent the tailgate gap; and a folding panel operatively disposed between the truck bed panel and the tailgate panel, the folding panel being pivotally connected to the truck bed panel and the tailgate panel, wherein the interconnected panels substantially cover a tailgate gap when a tailgate gap cover is mounted to a pickup truck. The folding panel being foldable from a unfolded configuration when the tailgate is in the horizontal open position, to a folded configuration when the tail gate is pivoted from the horizontal open position to the vertical closed position.

14 Claims, 8 Drawing Sheets

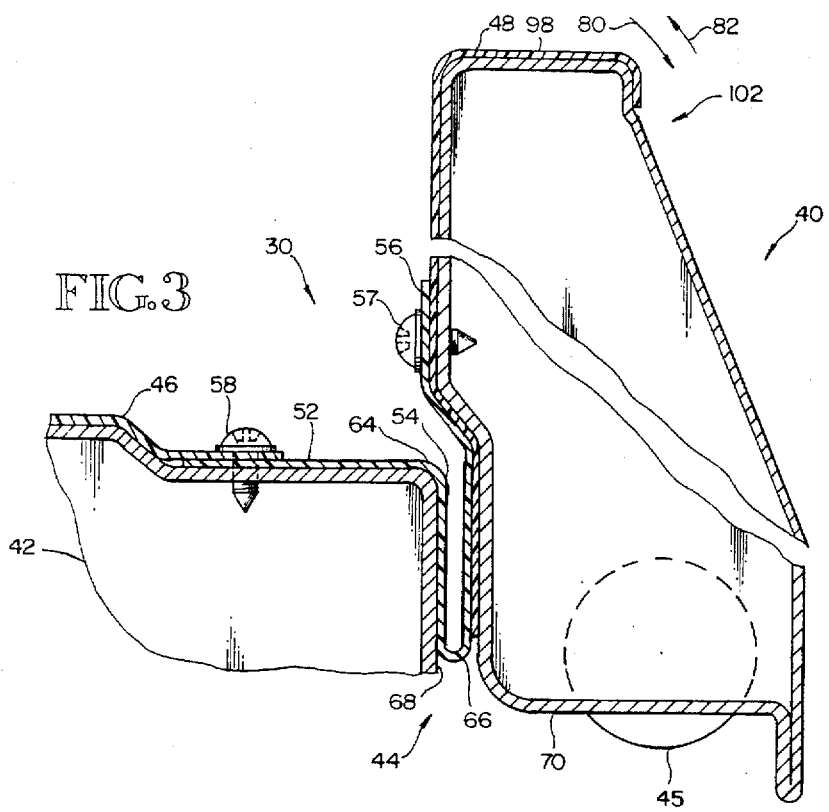
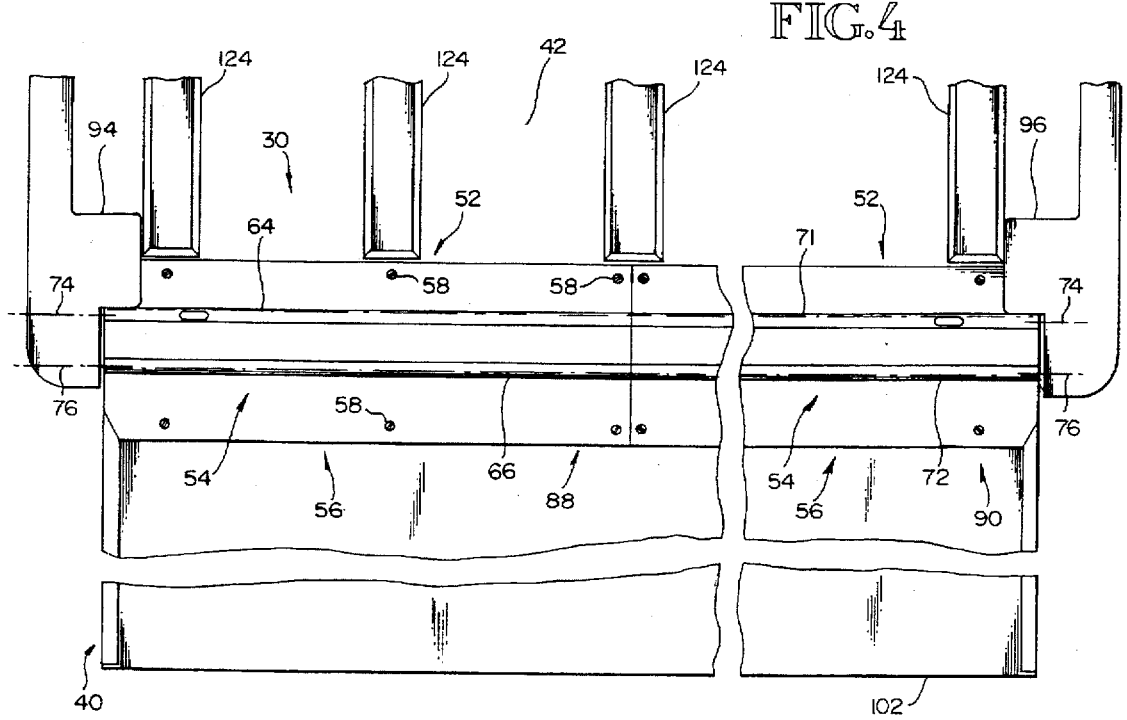

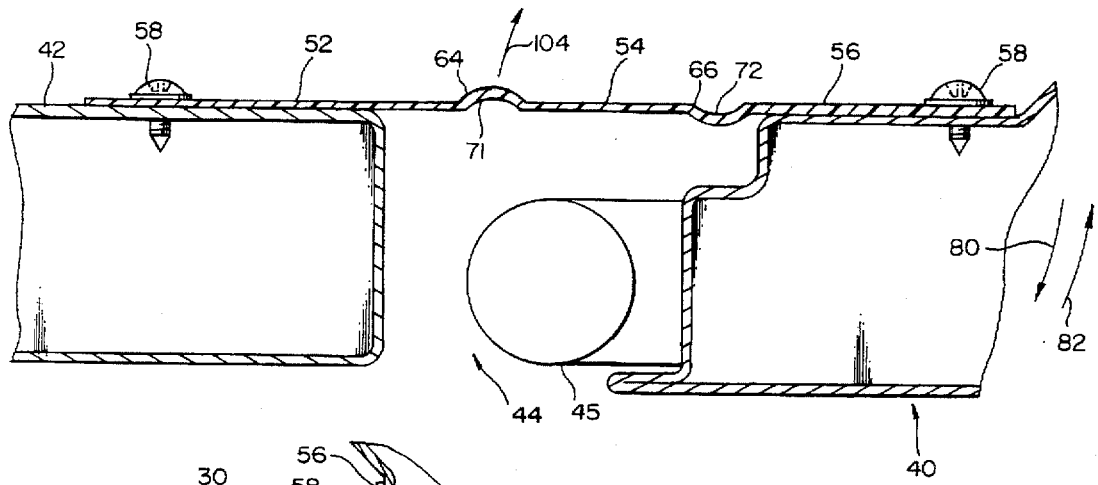
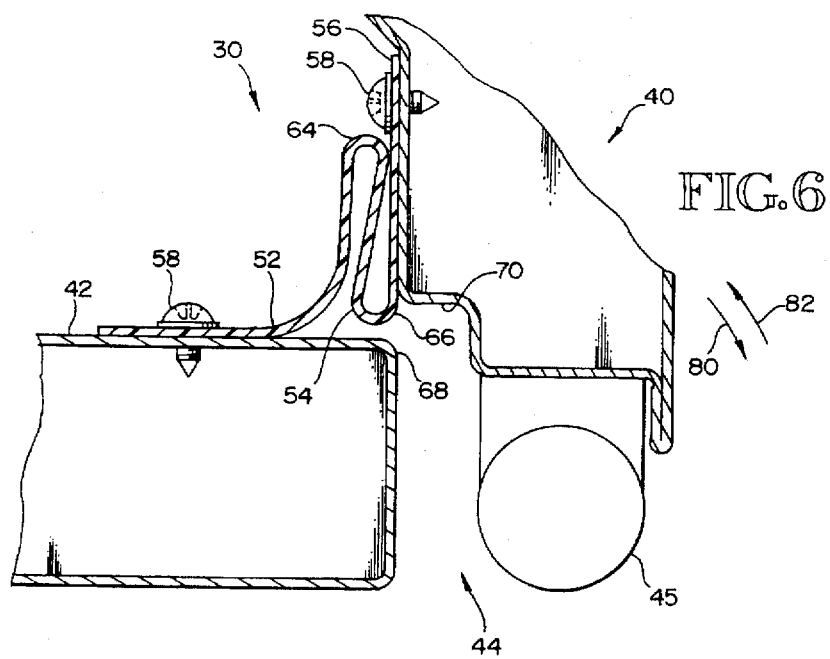

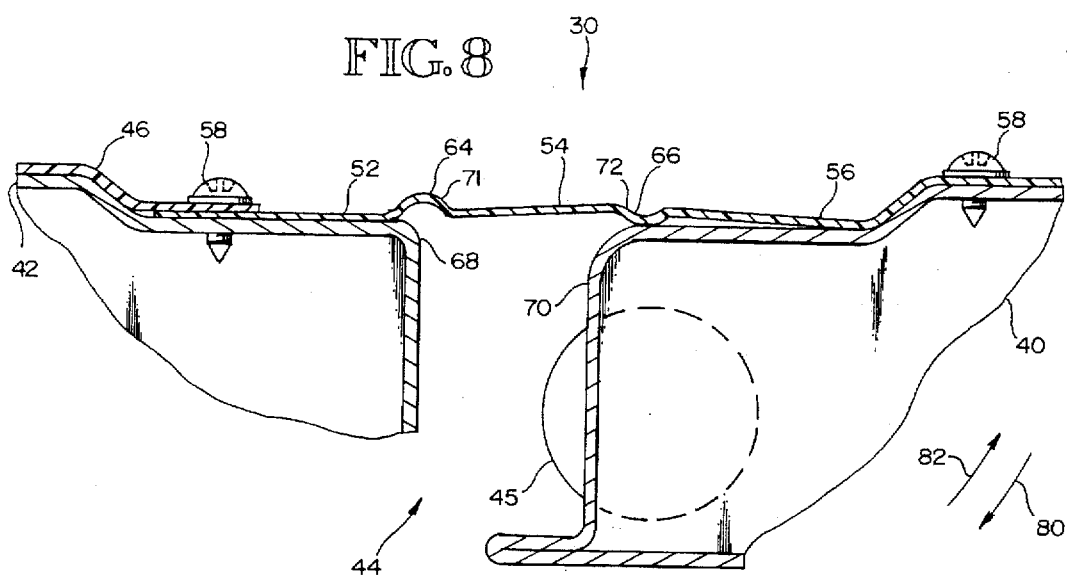

TAILGATE GAP COVER

BACKGROUND

This invention relates generally to truck bed liners and tailgate liners employed to protect the interior surfaces of pickup truck boxes, and more particularly to tailgate gap covers for covering the gap formed between the tailgate and the bed of a pickup truck.

For many years, owners and operators of pickup trucks have been faced with problems associated with light hauling of construction, landscaping and agricultural materials including grain and fertilizers, crushed rock, sand, gravel, soil and other abrasive substances. Such materials have a tendency to harm the interior surfaces of the pickup truck box. Additionally, such materials often become lodged in the gap between the tailgate, and the end of the truck bed. Unless this gap is clear of such materials, the normal operation of the tailgate will be hampered and can result in permanent damage to the truck bed, the tailgate and its associated hinges.

To help alleviate these problems, pickup truck bed liners and tailgate liners have been employed for many years. Typically, such liners are molded from a plastic material to fit against the interior surfaces of a pickup truck box. Usually, truck bed liners and tailgate liners are manufactured as separate parts. For example U.S. Pat. Nos. 4,161,335; 4,181,349; 4,333,678; 4,336,963; 4,341,412; 4,592,583; 4,752,097; and 4,944,612 disclose truck bed and tailgate liners manufactured in two separate parts. However, as a result of such two-part construction, these liners provide little protection to prevent debris from falling into the tailgate gap.

To some extent, the problem of hinge protection and the problem of preventing foreign objects from entering the tailgate gap has been addressed in the past. For example, in 1941 U.S. Pat. No. 2,258,447 issued to P. R. Fairbanks disclosing an arrangement for dump trucks that includes a bed plate having a concave end for a close fit adjacent to the tailgate hinge. Although this design would remove debris from the hinge, it nevertheless permits debris to contact the hinge. Also, because of its construction, the '447 device would not operate with modern pickup trucks that have a tailgate gap.

In 1970 U.S. Pat. No. 3,544,155 issued to V. D. Gardner disclosing a tailgate sealer made of canvas or a like flexible material for the protection of the interior surface of the tailgate of a truck. The '155 arrangement includes rods at each end of the canvas. One rod interlocks with existing side posts on the truck body, and another rod is used as a weight to keep the canvas taut as the tailgate pivots about its hinge axis. Thus, the canvas slides across the tailgate surface when the tailgate is pivoted to either the open or closed position. Accordingly, because this design employees a weighted canvas that is loosely draped over the tailgate, it is impractical for use in situations where high vehicle speed could cause the rods or canvas to vibrate and possibly cause damage to the truck. In addition, canvas sliding across the surface of the tailgate could damage the same if abrasive particles were lodged between the canvas and the tailgate.

Subsequent to the '155 patent, U.S. Pat. No. 3,881,768 issued to Nix disclosing a one piece truck bed and tailgate liner connected by a thin piece of material disposed to form a connecting web. Because the tailgate liner is integrally connected to the bed liner, the thin web must have the ability to stretch and expand when the tailgate is pivoted from the upward closed position to the downward open position. Accordingly, after many cycles of operation, performance of the liner material is likely to deteriorate. In addition, the Nix '768 patent can only be installed as a complete truck liner bed package. As such, it cannot be utilized to retrofit pickup trucks having existing bed liners and tailgate liners.

Similarly, in 1988, U.S. Pat. No. 4,763,945 issued to Murray disclosing a tailgate track mat. Like the earlier Nix patent, the Murry '945 Patent discloses a tailgate part that covers the tailgate gap. However, the '945 patent employs magnets incorporated therein to allow the mat to slide in relation to the tailgate when the same opened or closed, i.e., when the tailgate pivots from the closed position to the open position. With this design, the mat does not automatically return to a predetermined position when the tailgate is then moved back to the closed position. This would likely cause it to become lodged in the tailgate gap thereby preventing the tailgate from closing. Additionally, if a truck having a track mat were loaded with material that covered the mat, the same would be further restricted from sliding back into position when the tailgate is moved from the open position to the closed position.

In 1993, U.S. Pat. No. 5,188,415 issued to Wagner disclosing a pivotable tailgate connector in which a rigid member covers the gap formed between the truck bed and tailgate. The rigid member is pivotally connected to the truck bed, and pivots upward as the tailgate moves from the downward open position to the upward closed position. Although this design allows heavy objects to be rolled across the tailgate gap, it shares many of the problems inherent with previously patented gap covers. Namely, under normal operating conditions, when the tailgate is cycled to and from the open and closed position, damage from friction caused by sliding of the rigid member across the tailgate surface could occur. Additionally, it would be difficult to obtain a satisfactory fit to prevent granular material and debris from falling into the tailgate gap.

As seen from the above, tailgate gap cover devices in one way or another must adapt to the pivoting action of a tailgate. Previous gap cover designs have typically compensated for the pivoting action of a tailgate by either permitting a sliding motion between the tailgate and the gap cover, or by having the gap cover stretch and expand. Either such action, however presents problems as noted above.

Accordingly, a need remains for an inexpensive tailgate gap cover that can be easily retrofitted to pickup trucks having existing truck bed and tailgate liners as well as to pickup trucks that are not equipped with liners. A tailgate gap cover that, when installed, can compensate for the pivoting motion of a tailgate with out causing the gap cover material to stretch or slide against the tailgate.

SUMMARY

One object of the present invention is to protect and preserve painted surfaces of a pickup truck, and to minimize wear and tear of the truck bed and tailgate from abrasion and damage caused by debris that accumulates in the tailgate gap.

A second object of the invention is to significantly reduce the time required to clean-out the gap between the truck bed and tailgate after loading and unloading debris, so that the tailgate can properly close.

A third object is to prevent the release and escapement of nails, broken glass and other road hazards through the tailgate gap onto a job site, highways or the like.

Another object is to provide a bridge across the tailgate gap to facilitate the use of hand-trucks for loading and off-loading heavy materials.

A further object is to enhance trucks having existing bed and tailgate liners with a readily installed, retrofitted component designed to minimize the accumulation of debris in the tailgate gap.

Yet another object is to provide an original equipment component for installation by truck manufactures for use with original equipment truck bed and tailgate liners.

Still another object of the present invention is to substantially prevent air, dust, and the like from entering the truck box through the tailgate gap.

The invention is a folding tailgate gap cover that prevents sand, soil, gravel and debris from passing through or becoming lodged in the tailgate gap formed between the truck bed of a pickup truck and its tailgate. The tailgate gap cover is designed for attachment to pickup trucks of the type having a truck box defined by a truck bed, two opposing side walls, a front wall, and a pivotable tailgate that pivots about a horizontal hinge pivot axis, from a vertical closed position to a horizontal open position. The tailgate gap cover includes a plurality of adjacently disposed panels that are interconnected.

The arrangement of all the panels thereof comprise a truck bed panel, a tailgate panel, and a folding panel disposed between the truck bed panel and the tailgate panel. More specifically, when a tailgate gap cover is installed, the truck bed panel is removably attached to the pickup truck bed, adjacent the tailgate gap. Similarly, the tailgate panel is removably attached to the tailgate of the pickup truck, adjacent the tailgate gap. Accordingly, the folding panel is operatively disposed between the truck bed panel and the tailgate panel for substantially bridging and covering the tailgate gap when the tailgate is in the open horizontal position, or the closed vertical position.

To accommodate the pivoting action of a tailgate, the folding panel is foldable from a unfolded configuration when the tailgate is in the horizontal open position, to a folded configuration when the tail gate is moved from the horizontal open position to the vertical closed position. In this way, the components of the tailgate gap cover cooperate to cover the tailgate gap without stretching, expanding, or sliding against truck surfaces when the tailgate is pivoted to and from the open and closed position.

In another aspect of the invention, the tailgate gap cover comprises two panels: a truck bed panel and a tailgate panel. In this configuration, the truck bed panel includes a folding joint. In operation, when the tailgate is pivoted to the closed vertical position, the truck bed panel folds downward into the tailgate gap. Accordingly, the truck bed panel conforms to the shape of the trailing edge of the truck bed.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 3 is a partial cross-sectional view taken through the tailgate gap with the tailgate oriented in the vertical closed position, the view illustrating a folding panel folded down into the tailgate gap, wherein the tailgate panel extends over an existing tailgate liner, and the truck bed panel extends under and existing truck bed liner.

FIG. 4 is a partial plan view of an installed tailgate gap cover with the pickup truck's tailgate disposed in the horizontal open position.

FIG. 5 is a partial cross-sectional view taken through the tailgate gap illustrating a tailgate gap cover installed on a pickup truck with the tailgate in the horizontal open position.

FIG. 6 is a partial cross-sectional view taken through the tail gate gap illustrating a tailgate gap cover installed on a pickup truck with the tailgate in the vertical closed position, with the folding panel in an upward folded position.

FIG. 8 is a partial cross-sectional view taken through the tailgate gap with the tailgate oriented in the horizontal open position, the view illustrating a folding panel covering the tailgate gap, wherein the tailgate panel extends to cover the tailgate.

DETAILED DESCRIPTION OF PREFERRED EMBODIMENT

Figure 1:
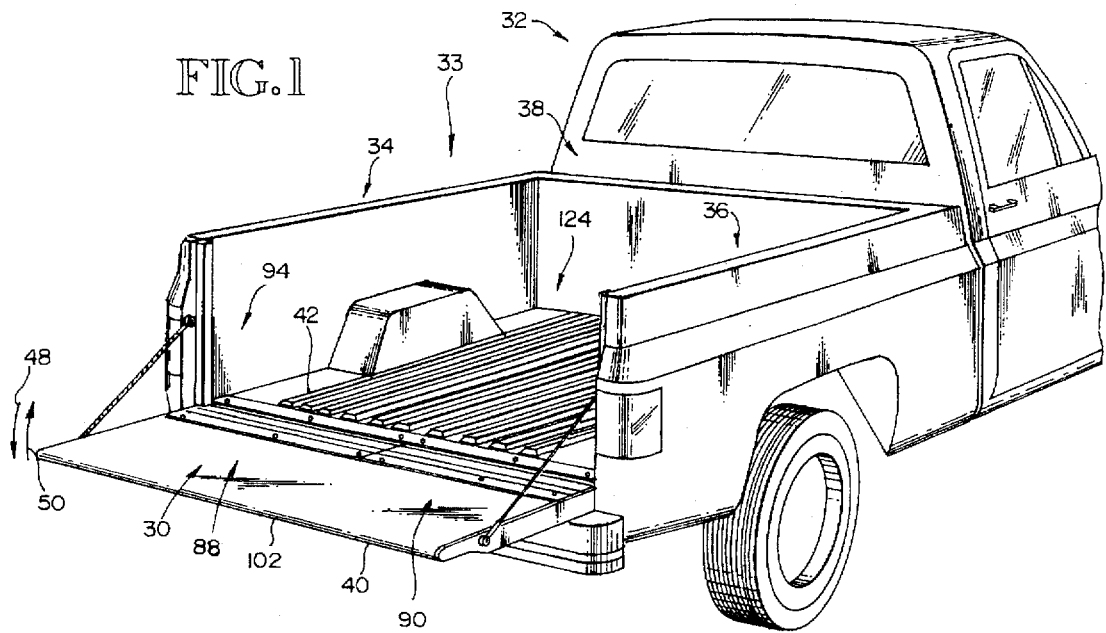
FIG. 1. is a rear, passenger side perspective of a pickup truck with its tailgate in the horizontal open position, the pickup truck having a tailgate gap cover installed to extend over the tailgate gap that is formed between the tailgate and the pickup truck bed.

Indicated generally at 30 is a tailgate gap cover constructed in accordance with the present invention. The tailgate gap cover 30 is provided to retrofit a standard style pickup truck 32 of the type having a truck box 33 defined by two opposing side walls 34–36, a front wall 38, a tailgate 40, and a truck bed 42. The tailgate gap cover 30 is designed to cover the tailgate gap 44 that is formed between the truck bed 42 and the tailgate 40. In this way, sand, soil, gravel and the like (not illustrated) are prevented from lodging or passing through the tailgate gap 44 thereby protecting truck components and surfaces that comprise or are adjacent to the tailgate gap 44 from damage.

Figure 2:
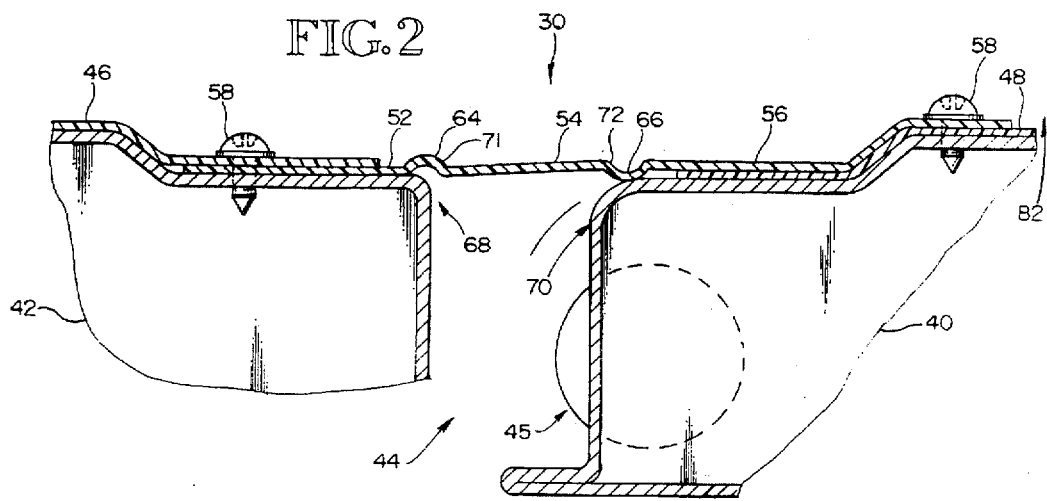
FIG. 2 is a partial cross-sectional view taken through the tailgate gap, illustrating a tailgate gap cover installed on a pickup truck having an existing truck bed and tailgate liner, wherein the tailgate is in the horizontal open position.

The tailgate gap cover 30 includes a plurality of adjacently disposed interconnected panels arranged in parallel spaced relation, parallel to the tailgate gap 44. More specifically, the interconnected panels extend parallel to the tailgate gap 44, substantially from one sidewall 34 to an opposite sidewall 36. As will be seen in the following, this arrangement allows the components of the tailgate gap cover 30 to operate without elongating, stretching or sliding across the adjacent surfaces of the pickup truck 32 when the tailgate 40 is pivoted to the open or closed position about a tailgate hinge 45. It should be noted that distinct types of tailgate hinge construction are illustrated. More specifically, as illustrated in FIG. 5, one construction is disclosed, e.g., the tailgate hinge 45, and the axis thereof, are disposed within the tailgate gap 44 between the trailing edge 68 of the truck bed and the bottom edge 70 of the tailgate. Alternatively, as illustrated in FIGS. 2–3, the pivot axis of tailgate hinge 45 is disposed within the bottom edge 70 of the tailgate 40, i.e., between bottom edge 70 and aft edge 102 of the tailgate.

Turning now to FIGS. 1–4, a preferred embodiment is illustrated showing a tailgate gap cover 30 retrofitted to a pickup truck 32 that includes an existing truck bed liner 46, and tailgate liner 48. In the preferred embodiment, the tailgate gap cover 30 includes three primary components: a truck bed panel 52; a folding panel 54; and a tailgate panel 56. For ease of manufacture, the panel components of a tailgate gap cover 30 can be vacuum formed or extruded from polyethylene plastic or Teflon®. Accordingly, this type of construction produces a tailgate gap cover 30 that is one-piece, i.e., the tailgate gap cover 30 is continuous and unbroken, wherein the various panels are integrally joined. However, as will hereinafter be more fully described, the preferred embodiment of a tailgate gap cover 30 comprises two separate independent "one piece" sections.

Normal installation of the tailgate gap cover 30 requires attachment of the truck bed panel 52 to a truck bed 42, and attachment of the tailgate panel 56 to a tailgate 40. In this way, the tailgate gap 44 is effectively covered by a folding panel 54 disposed therebetween, integrally attached to the truck bed panel 52 and the tailgate panel 56. Typically, the truck bed panel 52 and the tail gate panel 56 are respectively attached to a truck bed 42 and tailgate 40 by common sheet metal fasteners 58–60. The number of fasteners required per panel varies and is usually greater than 4 depending on the size of the pickup 32 truck and the configuration of the panels.

Considering now in more detail the structure of the components of a tailgate gap cover 30, in the preferred embodiment, the folding panel 54 includes a pair of spaced apart folding joints 64–66. Each folding joint 64–66 extends parallel to the tailgate gap 44 the full length of the tailgate gap cover 30. In this way, the folding joints 64–66 act as elongate hinges, that perform similar to a "piano hinge." With this arrangement each folding joint 64–66 defines a folding axis: folding joint 64 defines folding axis 74, and folding joint 66 defines folding axis 76. Thus, when the tailgate 40 is pivoted to either the open or closed position as indicated by arrows 80–82, the folding panel 54 pivots and moves either into the tailgate gap 44 as illustrated in FIG. 3, or above the tailgate gap 44 as illustrated in FIG. 6.

As noted above, in the preferred embodiment the tailgate gap cover 30, is vacuum formed or molded which therefore results in the folding joints 64–66, being integrally formed with the panel components 52–56. In this way, the folding joints 64–66 can be so formed, molded or extruded in a way that produces built-in "memory", i.e., natural bias to fold in a predetermined manner. To put it differently, the gap cover 30 is formed to naturally assume the folded configuration, e.g., as illustrated in FIG. 3. Then, after installation, the tailgate gap cover 30 maintains a bias to return to the folded configuration when a tailgate 40 is pivoted from the open horizontal position to the closed vertical position.

As illustrated in FIG. 2, folding joints 64–66 are defined by grooves 71–72 that project in opposite directions when the tailgate 40 is in the open horizontal position; groove 71 projects upward and groove 72 projects downward. As illustrated in FIG. 2, groove 71 is disposed adjacent the trailing edge 68 of the truck bed 42. In this way, the folding panel 54 can closely fit and conform to the trailing edge 68 when the tailgate 40 is pivoted to the closed vertical position. Likewise, groove 72 is disposed adjacent the bottom edge 70 of the tailgate 40. With this configuration, folding joint 66 shifts into the tailgate gap 44 when the tailgate is pivoted to the closed position. Consequently, the central portion of folding panel 54 pivots about grooves 71–72 when the tailgate 40 is pivoted to the open or closed position.

Turning now to FIG. 4, a tailgate gap cover 30 is illustrated further comprising two similarly constructed mating sections: a driver's side section 88 and a passenger's side section 90. This configuration is provided for two primary reasons. First, installation of a tailgate gap cover 30 requires that the fit thereof to the pickup truck 32 be close and precise so as to minimize gaps that may occur between the tailgate gap cover 30 and the pickup truck 32. In this way, debris contained therein is substantially prevented from escaping. Secondly, for business reasons that include manufacture, transportation, and marketing, the tailgate gap cover 30 is divided into two similarly sized mating sections that can occupy less space when packaged for delivery.

Briefly, installation of the two section tailgate gap cover proceeds as follows. First, the driver's side section 88 is positioned to abut the corresponding truck bed side post 94. Then the mating passenger's side section 90 is positioned to abut the corresponding truck bed side post 96. Following that, because the mating sections are designed to be of sufficient size to overlap, a portion of one section can then be precisely trimmed so that sections 88–90 similarly abut in substantially the center of the truck bed 42. Finally, the two sections 88–90 are fastened to the surfaces of the pickup truck as previously discussed above.

Typically, the tailgate gap cover 30 is intended to retrofit pickup trucks 32 that have an existing truck bed and tailgate liners 46–48. In this situation, the truck bed panel 52 fits against the truck bed 42, under the existing truck bed liner 46. Moreover, the tailgate panel 56 fits over the existing tailgate liner 48. With this arrangement, debris can easily be swept or shoveled out the rear of the pickup truck 32.

Figure 7:
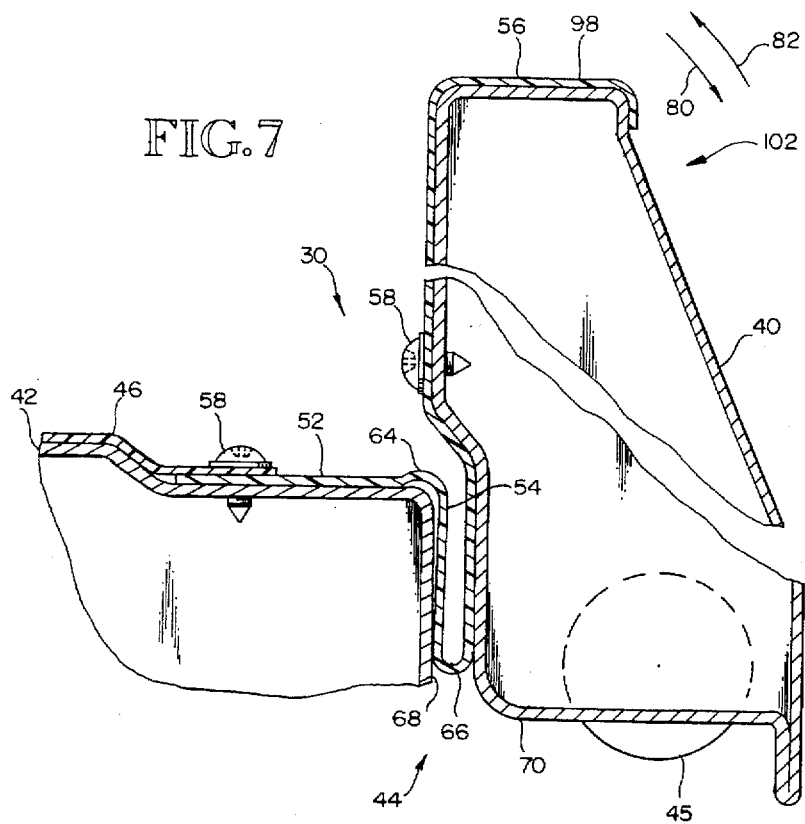
FIG. 7 is a partial cross-sectional view taken through the tailgate gap with the tailgate oriented in the vertical closed position, the view illustrating a folding panel folded down into the tailgate gap, wherein the tailgate panel extends to cover the tailgate.

However, other configurations of the tailgate gap cover 30 could be produced. For example, FIGS. 7–8 illustrate a tailgate gap cover 30 that includes a tailgate panel 56 that is of sufficient size and shape to cover substantially the entire tailgate 40 in a manner similar to a tailgate liner 48. With this embodiment, the tailgate panel 56 includes a lip 98 that engages the aft edge 102 of a tailgate 40 to securely hold the tailgate panel 56 in proper position. Similarly, the truck bed panel 52 could be formed to a sufficient size and shape to eliminate the need for a separate truck bed liner 46.

Turning now to FIGS. 5-6, a tailgate gap cover 30 is illustrated that operates with a folding panel 54 that folds in an upward direction, as shown by arrow 104 to a position adjacent the tailgate 40 when the tailgate 40 is pivoted to the closed vertical position. As Best seen in FIG. 5, this configuration includes a folding joint 64 disposed in spaced relation to the trailing edge 68 of the truck bed 42, i.e., the folding joint 64 is spaced toward the tailgate bottom edge 70. This configuration is useful in situations where the tailgate gap 44 is too narrow to receive a folding panel 54.

Figure 9:
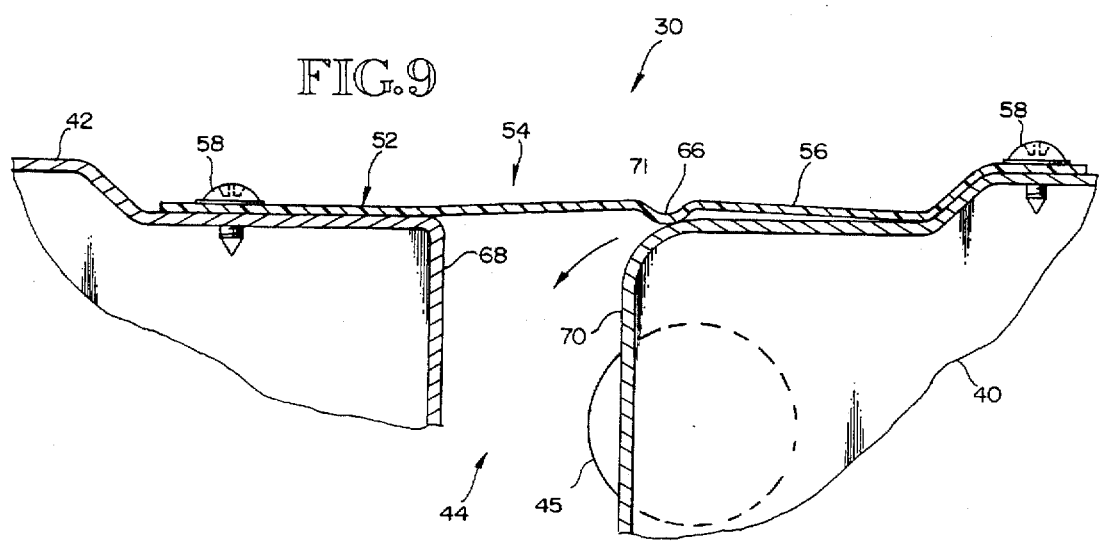
FIG. 9 is a partial cross-sectional view taken through the tailgate gap with the tailgate oriented in the horizontal open position, the view illustrating a folding panel covering and bridging the tailgate gap, wherein the tailgate gap cover installation is independent of truck bed and tailgate liners.
Figure 10:
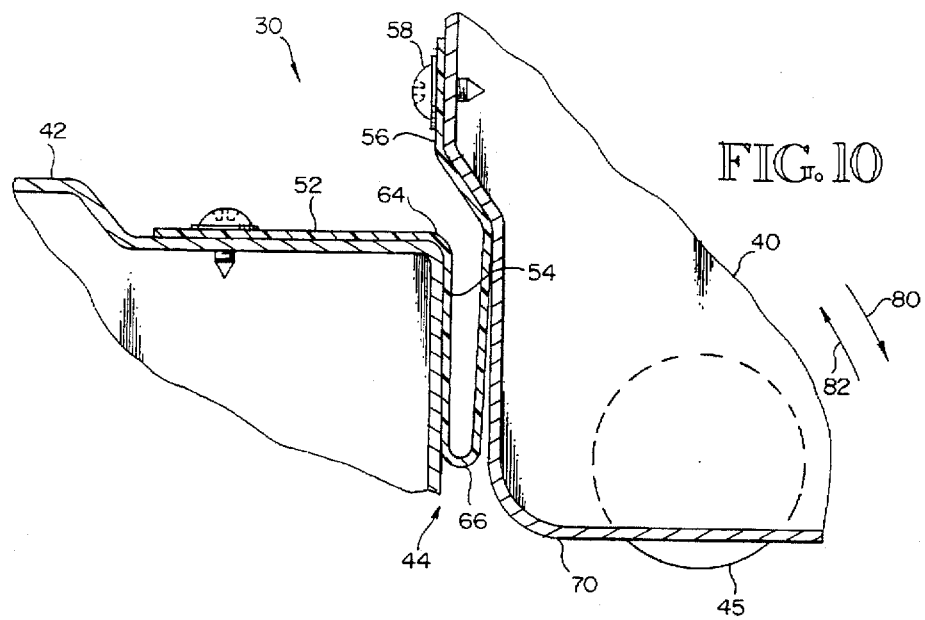
FIG. 10 is a partial cross-sectional view taken through the tailgate gap with the tailgate oriented in the vertical closed position, the view illustrating a folding panel folded down into the tailgate gap, wherein the tailgate gap cover installation is independent of truck bed and tailgate liners.

Referring now to FIGS. 9-10 a tailgate gap cover 30 is illustrated that comprises two panels; a truck bed panel 52 and a tailgate panel 56. In this configuration, the truck bed panel 52 includes a folding joint 66. In operation, when the tailgate 40 is pivoted to the closed vertical position, the truck bed panel 52 folds downward into the tailgate gap 44. Accordingly, the truck bed panel 52 conforms to the shape of the trailing edge of the truck bed 42.

Figure 11:
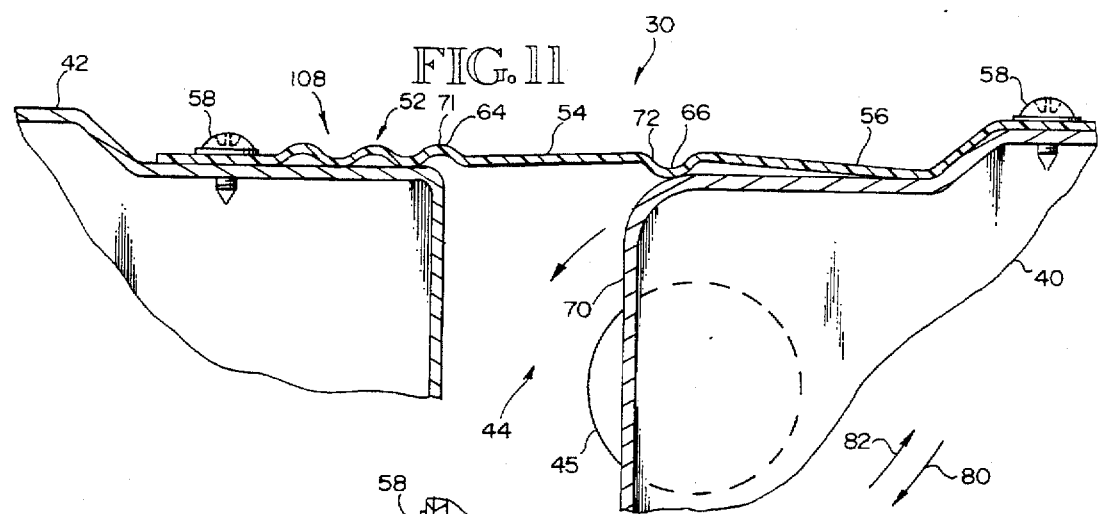
FIG. 11 is a partial cross-sectional view taken through the tailgate gap with the tailgate oriented in the horizontal open position, the view illustrating an alternate embodiment with the truck bed panel including corrugations.
Figure 12:
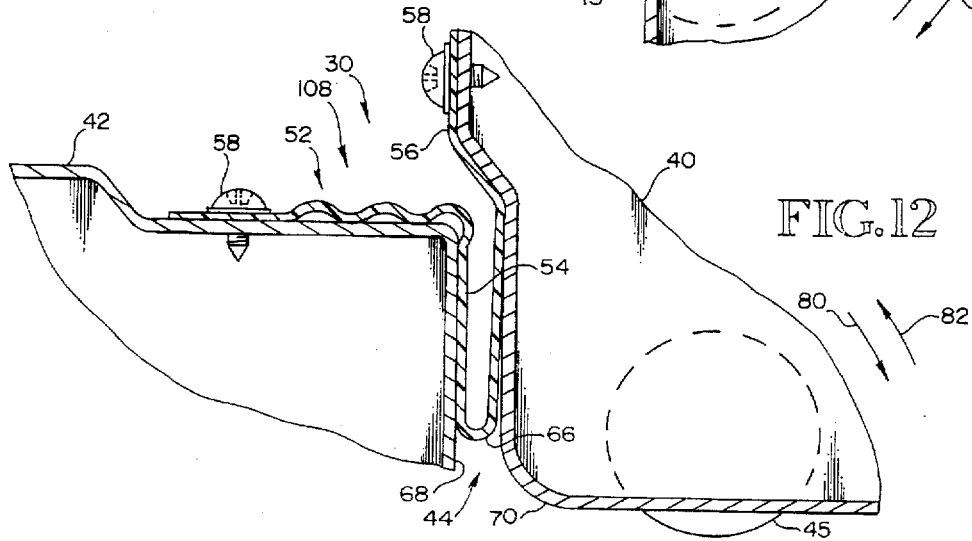
FIG. 12 is a partial cross-sectional view similar to FIG. 11 but with the tailgate oriented in the vertical closed position.

Finally, other embodiments of the tailgate gap cover 30 are illustrated in FIGS. 11-15. FIGS. 11-12 illustrates a tailgate gap cover 30 comprising three panels: a truck bed panel 52, a folding panel 54, and a tailgate panel 56, wherein the truck bed panel 52 includes a plurality of corrugations 108 that extend the entire length of the tailgate gap cover 30, parallel to the tailgate gap 44. The corrugations 108 are included as a stress relieving measure that is necessary when the tailgate gap cover 30 is constructed of certain materials including stiffer plastics and thin metals such as spring steel. In addition to relieving and absorbing stress, the corrugations 108 minimize fatigue and shock caused by the opening and closing of the tailgate.

Figure 13:
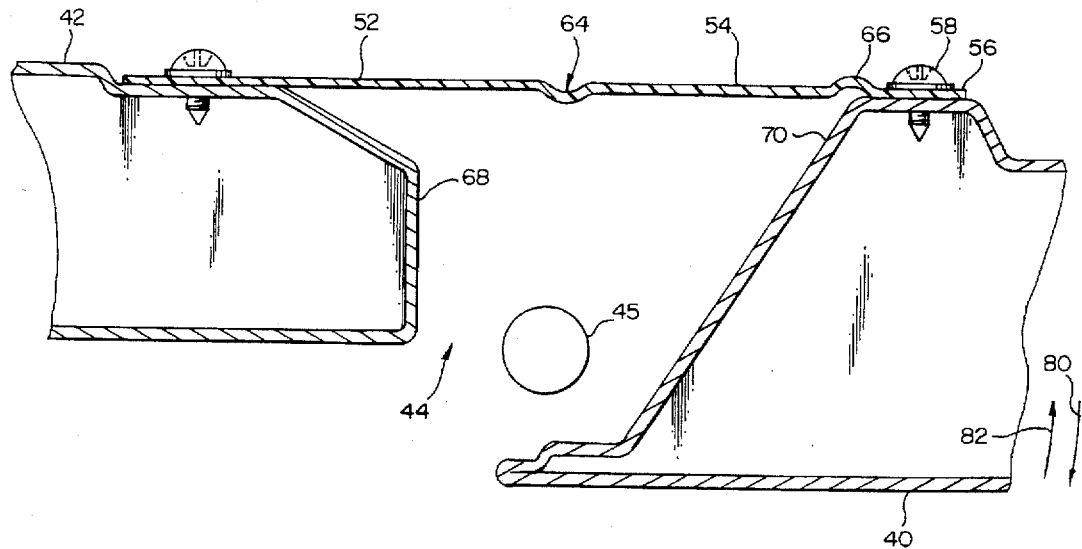
FIG. 13 is a partial cross-sectional view taken through the tailgate gap illustrating a tailgate gap cover installed on a pickup truck with the tailgate in the horizontal open position.
Figure 14:
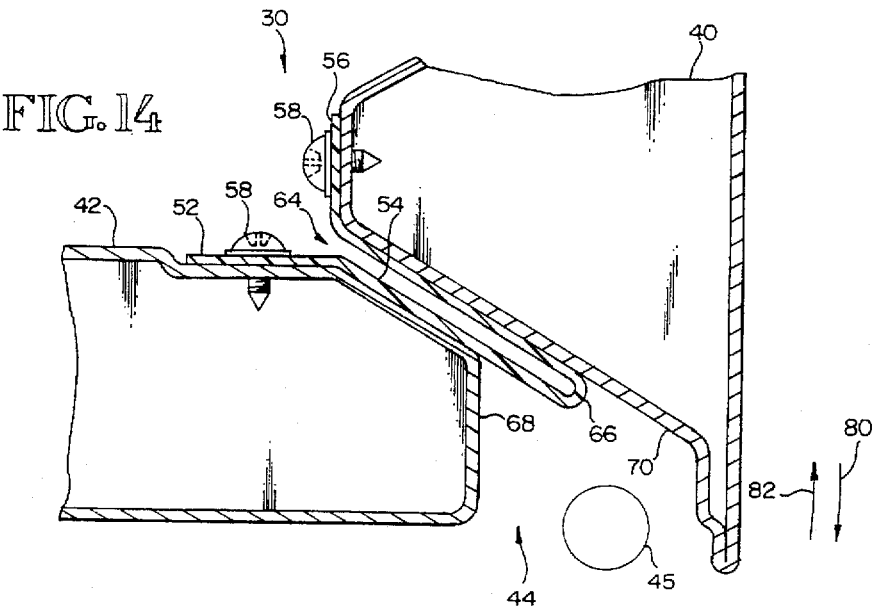
FIG. 14 is a partial cross-sectional view taken through the tail gate gap illustrating a tailgate gap cover installed on a pickup truck with the tailgate in the vertical closed position, with the folding panel in a downward folded position.

FIGS. 13-14 illustrate a tailgate gap cover 30 adapted to a pickup truck 32 having an unusual tailgate 40 arrangement. Here, the tailgate gap 44 slants to one side thereby guiding the tailgate gap cover 30 in a similar direction. Further, as see in FIGS. 13-14, the folding joint 64 is disposed substantially in the center of the tailgate gap 44.

Figure 15:
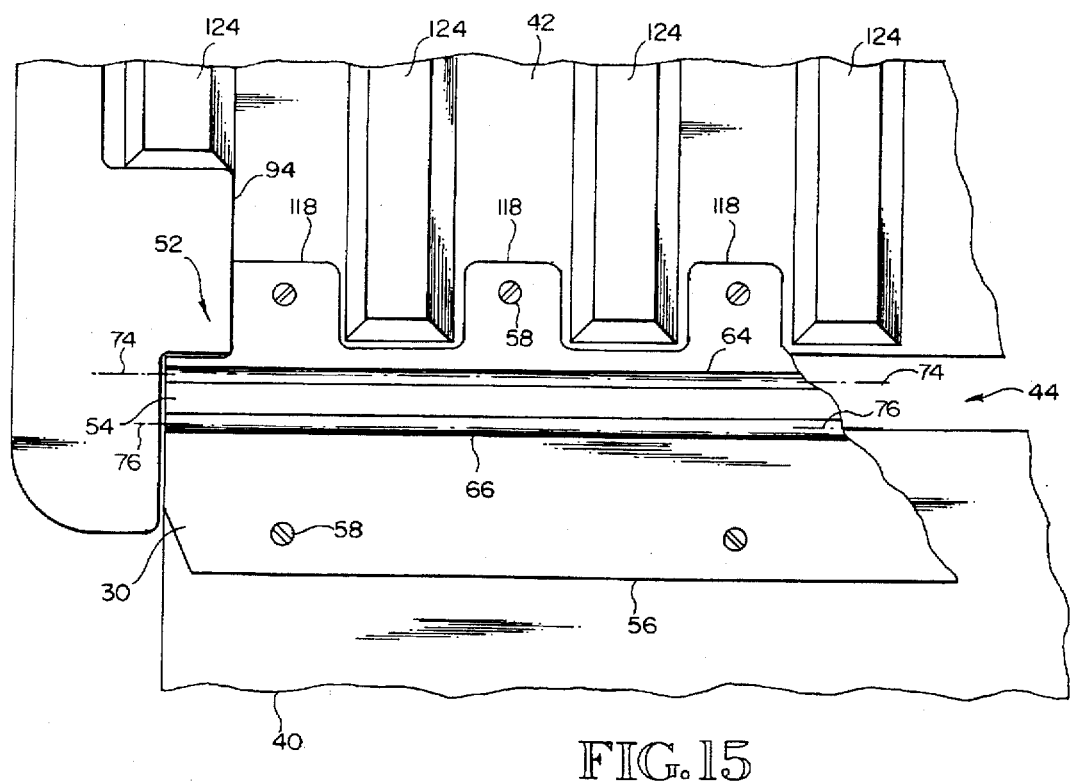
FIG. 15 is a partial plan view of an alternate embodiment illustrating an installed tailgate gap cover having connection tabs on the tailgate panel for connecting the tailgate gap cover to a pickup truck, wherein the pickup truck's tailgate is disposed in the horizontal open position.

FIG. 15. Illustrates a three panel tailgate gap cover 30 wherein the truck bed panel 52 includes a plurality of horizontally spaced apart connection tabs 118. The connection tabs 118 are provided to facilitate installation of a tailgate gap cover 30 to pickup trucks having little or no space between the truck bed trailing edge 68 and the truck bed reinforcements 124. Typically, the truck bed panel 52 of a tailgate gap cover 30 is fastened to the truck bed 42 in a substantially flat planar area disposed between the truck bed trailing edge 68 and the reinforcements 124. However, with certain pickup trucks, this space is extremely limited. Accordingly, tailgate gap cover 30 modifications are necessary in this situation. As seen in FIG. 15, the connection tabs 118 are spaced to attach to the truck bed 42 between the reinforcements 124. In this way, the connection tabs 118 are positioned for ease of removing or shoveling debris from the truck box 33.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

That which is claimed is:

1. A tailgate gap cover for attachment to pickup trucks of the type having a truck box defined by a truck bed, two opposing side walls, a front wall, and a pivotable tailgate that pivots about a horizontal hinge pivot axis, from a vertical closed position to a horizontal open position, the tailgate gap cover being provided to prevent sand, soil, gravel and debris from passing through or becoming lodged in the tailgate gap formed between the truck bed of a pickup truck and its tailgate, wherein the tailgate gap cover includes a plurality of adjacently disposed interconnected panels, the arrangement of all the panels thereof comprising:

a truck bed panel disposed for removable attachment to the truck bed of a pickup truck, adjacent the tailgate gap;

a tailgate panel disposed for removable attachment to the tailgate of a pickup truck, adjacent the tailgate gap;

a folding panel operatively disposed between the truck bedpanel and the tailgate panel, the folding panel being pivotally connected to the truck bed panel and the tailgate panel, wherein the interconnected panels substantially cover the tailgate gap when the tailgate gap cover is mounted to a pickup truck;

the folding panel further comprising a pair of spaced apart folding joints that extend parallel to the tailgate gap, each said folding joint being defined by a groove, wherein the grooves project in opposing directions when the tailgate is in the horizontal open position; and wherein the folding panel pivots about said folding joints when the tailgate is pivoted, the folding panel being foldable from an unfolded configuration when the tailgate is in the horizontal open position, to a folded configuration when the tail gate is pivoted from the horizontal open position to the vertical closed position.

2. A tailgate gap cover as recited in claim 1, the truck bed further including a trailing edge disposed adjacent the tailgate gap, and the tailgate further including a bottom edge disposed adjacent the tailgate gap;

wherein, when the tailgate is in the horizontal open position, a folding joint defined by an upward projecting groove is disposed adjacent the trailing edge of the truck bed in spaced relation to the bottom edge of the tailgate, and a folding joint defined by a downward projecting groove is disposed adjacent the bottom edge of the tailgate;

wherein said tailgate hinge pivot axis being disposed within the bottom edge of the tailgate; and wherein said folding panel shifts downward, into the tailgate gap when the tailgate is pivoted from the horizontal open position to the vertical closed position.

3. A tailgate gap cover as recited in claim 1, the truck bed further including a trailing edge disposed adjacent the tailgate gap, and the tailgate further including a bottom edge disposed adjacent the tailgate gap;

wherein, when the tailgate is in the horizontal open position, a folding joint defined by an upward projecting groove is spaced from the bottom edge of the tailgate, disposed over the tailgate gap, and a folding joint defined by a downward projecting groove is disposed adjacent the bottom edge of the tailgate;

wherein the tailgate hinge pivot axis is disposed within the tailgate gap between the trailing edge of the truck bed and the bottom edge of the tailgate; and wherein said folding panel shifts upward, adjacent the tailgate, when the tailgate is pivoted from the horizontal open position to the vertical closed position.

4. A tailgate gap cover as recited in claim 1 wherein said truck bed panel comprises a plurality of horizontally spaced apart connection tabs for connecting the truck bed panel to the bed of a pickup truck; wherein the spacing between the connection tabs corresponds to the spacing between spaced apart longitudinally disposed reinforcements formed in the bed of the pickup truck.

5. A tailgate gap cover as recited in claim 1 wherein each panel thereof comprises at least two adjacently disposed sections, including a driver's side section and a corresponding passenger's side section.

6. A tailgate gap cover as recited in claim 1 wherein the truck bed panel comprises a plurality of corrugations oriented parallel to the tailgate gap of the pickup truck.

7. A tailgate gap cover as recited in claim 1 wherein the truck bed includes a trailing edge disposed adjacent the tailgate gap; and an upward projecting folding joint is disposed adjacent the trailing edge of the truck bed when the tailgate is in the horizontal open position.

8. A tailgate gap cover as recited in claim 7 wherein said folding panel shifts downward, into the tailgate gap when the tailgate is pivoted from the horizontal open position to the vertical closed position.

9. A tailgate gap cover as recited in claim 1 wherein the tailgate includes a bottom edge disposed adjacent the tailgate gap; and a downward projecting folding joint is disposed adjacent the bottom edge of the tailgate when the tailgate is in the horizontal open position.

10. A tailgate gap cover for attachment to pickup trucks of the type having a truck box defined by a truck bed, two opposing side walls, a front wall, and a pivotable tailgate that pivots about a horizontal hinge pivot axis, from a vertical closed position to a horizontal open position, the tailgate gap cover being provided to prevent sand, soil, gravel and debris from passing through or becoming lodged in the tailgate gap formed between the truck bed of a pickup truck and its tailgate, wherein the tailgate gap cover includes a plurality of adjacently disposed interconnected panels, the arrangement of all the panels thereof comprising;

a truck bed panel disposed for removable attachment to the truck bed of a pickup truck, adjacent the tailgate gap;

a tailgate panel disposed for removable attachment to the tailgate of a pickup truck, adjacent the tailgate gap;

a folding panel operatively disposed between the truck bed panel and the tailgate panel, the folding panel being pivotally connected to the truck bed panel and the tailgate panel, wherein the interconnected panels substantially cover the tailgate gap when the tailgate gap cover is mounted to a pickup truck;

the folding panel further comprising a pair of spaced apart folding joints that extend parallel to the tailgate gap, each said folding joint being defined by a groove, wherein the grooves project in opposing directions when the tailgate is in the horizontal open position;

wherein the folding panel pivots about said folding joints when the tailgate is pivoted;

the folding panel being foldable from an unfolded configuration when the tailgate is in the horizontal open position, to a folded configuration when the tail gate is pivoted from the horizontal open position to the vertical closed position; and wherein each panel thereof comprises at least two adjacently disposed sections, including a driver's side section and a corresponding passenger's side section.

11. A tailgate gap cover as recited in claim 10, the truck bed further including a trailing edge disposed adjacent the tailgate gap, and the tailgate further including a bottom edge disposed adjacent the tailgate gap;

wherein, when the tailgate is in the horizontal open position, a folding joint defined by an upward projecting groove is disposed adjacent the trailing edge of the truck bed in spaced relation to the bottom edge of the tailgate, and a folding joint defined by a downward projecting groove is disposed adjacent the bottom edge of the tailgate;

wherein said tailgate hinge pivot axis being disposed within the bottom edge of the tailgate; and wherein said folding panel shifts downward, into the tailgate gap when the tailgate is pivoted from the horizontal open position to the vertical closed position.

12. A tailgate gap cover as recited in claim 10, the truck bed further including a trailing edge disposed adjacent the tailgate gap, and the tailgate further including a bottom edge disposed adjacent the tailgate gap;

wherein, when the tailgate is in the horizontal open position, a folding joint defined by an upward projecting groove is spaced from the bottom edge of the tailgate, disposed over the tailgate gap, and a folding joint defined by a downward projecting groove is disposed adjacent the bottom edge of the tailgate;

wherein the tailgate hinge pivot axis is disposed within the tailgate gap between the trailing edge of the truck bed and the bottom edge of the tailgate: and wherein said folding panel shifts upward, adjacent the tailgate, when the tailgate is pivoted from the horizontal open position to the vertical closed position.

13. A tailgate gap cover for attachment to pickup trucks of the type having a truck box defined by a truck bed, two opposing side walls, a front wall, and a pivotable tailgate that pivots about a horizontal hinge pivot axis, from a vertical closed position to a horizontal open position, the tailgate gap cover being provided to prevent sand, soil, gravel and debris from passing through or becoming lodged in the tailgate gap formed between the truck bed of a pickup truck and its tailgate, wherein the tailgate gap cover includes a plurality of adjacently disposed interconnected panels, the arrangement of all the panels thereof comprising:

a truck bed panel disposed for removable attachment to the truck bed of a pickup truck, adjacent the tailgate gap;

a tailgate panel disposed for removable attachment to the tailgate of a pickup truck, adjacent the tailgate gap;

a folding panel operatively disposed between the truck bed panel and the tailgate panel, the folding panel being pivotally connected to the truck bed panel and the tailgate panel, wherein the interconnected panels substantially cover the tailgate gap when the tailgate gap cover is mounted to a pickup truck;

the folding panel being foldable from an unfolded configuration when the tailgate is in the horizontal open position, to a folded configuration when the tailgate is pivoted from the horizontal open position to the vertical closed position;

wherein the truck bed panel comprises a plurality of horizontally spaced apart connection tabs for connecting the truck bed panel to the bed of a pickup truck;

the truck bed further including a trailing edge disposed adjacent the tailgate gap, and the tailgate further including a bottom edge disposed adjacent the tailgate gap;

the gap cover further comprising a pair of spaced apart folding joints arranged so that when the tailgate is in the horizontal open position, a folding joint defined by an upward projecting groove is disposed adjacent the trailing edge of the truck bed in spaced relation to the bottom edge of the tailgate, and a folding joint defined by a downward projecting groove is disposed adjacent the bottom edge of the tailgate;

wherein said tailgate hinge pivot axis being disposed within the bottom edge of the tailgate; and wherein said folding panel shifts downward, into the tailgate gap when the tailgate is pivoted from the horizontal open position to the vertical closed position.

14. A tailgate gap cover for attachment to pickup trucks of the type having a truck box defined by a truck bed, two opposing side walls, a front wall, and a pivotable tailgate that pivots about a horizontal hinge pivot axis, from a vertical closed position to a horizontal open position, the tailgate gap cover being provided to prevent sand, soil, gravel and debris from passing through or becoming lodged in the tailgate gap formed between the truck bed of a pickup truck and its tailgate, wherein the tailgate gap cover includes a plurality of adjacently disposed interconnected panels, the arrangement of all the panels thereof comprising:

a truck bed panel disposed for removable attachment to the truck bed of a pickup truck, adjacent the tailgate gap;

a tailgate panel disposed for removable attachment to the tailgate of a pickup truck, adjacent the tailgate gap;

a folding panel operatively disposed between the truck bed panel and the tailgate panel, the folding panel being pivotally connected to the truck bed panel and the tailgate panel, wherein the interconnected panels substantially cover the tailgate gap when the tailgate gap cover is mounted to a pickup truck;

the folding panel being foldable from an unfolded configuration when the tailgate is in the horizontal open position, to a folded configuration when the tailgate is pivoted from the horizontal open position to the vertical closed position; and wherein the truck bed panel comprises a plurality of horizontally spaced apart connection tabs for connecting the truck bed panel to the bed of a pickup truck;

the truck bed further including a trailing edge disposed adjacent the tailgate gap, and the tailgate further including a bottom edge disposed adjacent the tailgate gap;

the gap cover further comprising a pair of spaced apart folding joints arranged so that when the tailgate is in the horizontal open position, a folding joint defined by an upward projecting groove is spaced from the bottom edge of the tailgate, disposed over the tailgate gap, and a folding joint defined by a downward projecting groove is disposed adjacent the bottom edge of the tailgate;

wherein the tailgate hinge pivot axis is disposed within the tailgate gap between the trailing edge of the truck bed and the bottom edge of the tailgate, and wherein said folding panel shifts upward, adjacent the tailgate, when the tailgate is pivoted from the horizontal open position to the vertical closed position.

\* \* \* \* \*